United States Patent
Haugh

[19]

[11] Patent Number: 5,983,960
[45] Date of Patent: Nov. 16, 1999

[54] OIL CONTAINER REPOSITORY

[75] Inventor: Carlton Haugh, 4132 W. 63$^{rd}$ St., Los Angeles, Calif. 90043

[73] Assignee: Carlton Haugh, L.A., Calif.

[21] Appl. No.: 09/154,599

[22] Filed: Sep. 17, 1998

[51] Int. Cl.$^6$ .................................................. B65B 3/04
[52] U.S. Cl. ............................. 141/106; 141/86; 141/98; 184/1.5; 220/571
[58] Field of Search .............................. 141/86, 98, 106, 141/313, 314, 316, 363–366; 184/1.5, 106; 220/571, 572, 573

[56] References Cited

U.S. PATENT DOCUMENTS

| | | | |
|---|---|---|---|
| 2,343,248 | 3/1944 | Smith | 141/98 |
| 2,369,982 | 2/1945 | Richards | 141/106 |
| 3,156,270 | 11/1964 | Erickson | 141/106 |
| 4,022,257 | 5/1977 | O'Connell | 141/98 |
| 4,054,184 | 10/1977 | Marcinko | 184/1.5 |
| 4,064,969 | 12/1977 | Black | 184/1.5 |
| 4,705,248 | 11/1987 | McIntyre | 184/1.5 |
| 5,172,739 | 12/1992 | Ristroph | 141/98 |
| 5,415,210 | 5/1995 | Hannah | 141/86 |
| 5,653,271 | 8/1997 | Brittain et al. | 141/98 |
| 5,921,292 | 7/1999 | Fouts | 141/98 |

*Primary Examiner*—J. Casimer Jacyna

[57] ABSTRACT

The invention is directed to an oil container repository designed to separately collect used motor oil containers and the residual oil left over within each container so that each can be recycled. The invention, in one embodiment, comprises an upper and a lower compartment. The upper compartment has an opening on the top to receive discarded oil containers. A divider separates the upper compartment with the lower compartment. The divider may have a tilted V shape surface and an opening at the bottom. The opening connects the upper compartment to the lower compartment such that the collected containers remain in the upper compartment as they can not fit through the opening. However, opening is sufficiently large to allow the residual motor oil flow through and into the second compartment. The second compartment in turn has an opening for drainage which will permit the drainage of collected motor oil from said second compartment. Alternative embodiments of the invention may include within the upper compartment a bag for easy collection and removal of the discarded motor oil containers, said bag having an opening to permit the drainage of the residual oil into the second compartment.

11 Claims, 2 Drawing Sheets

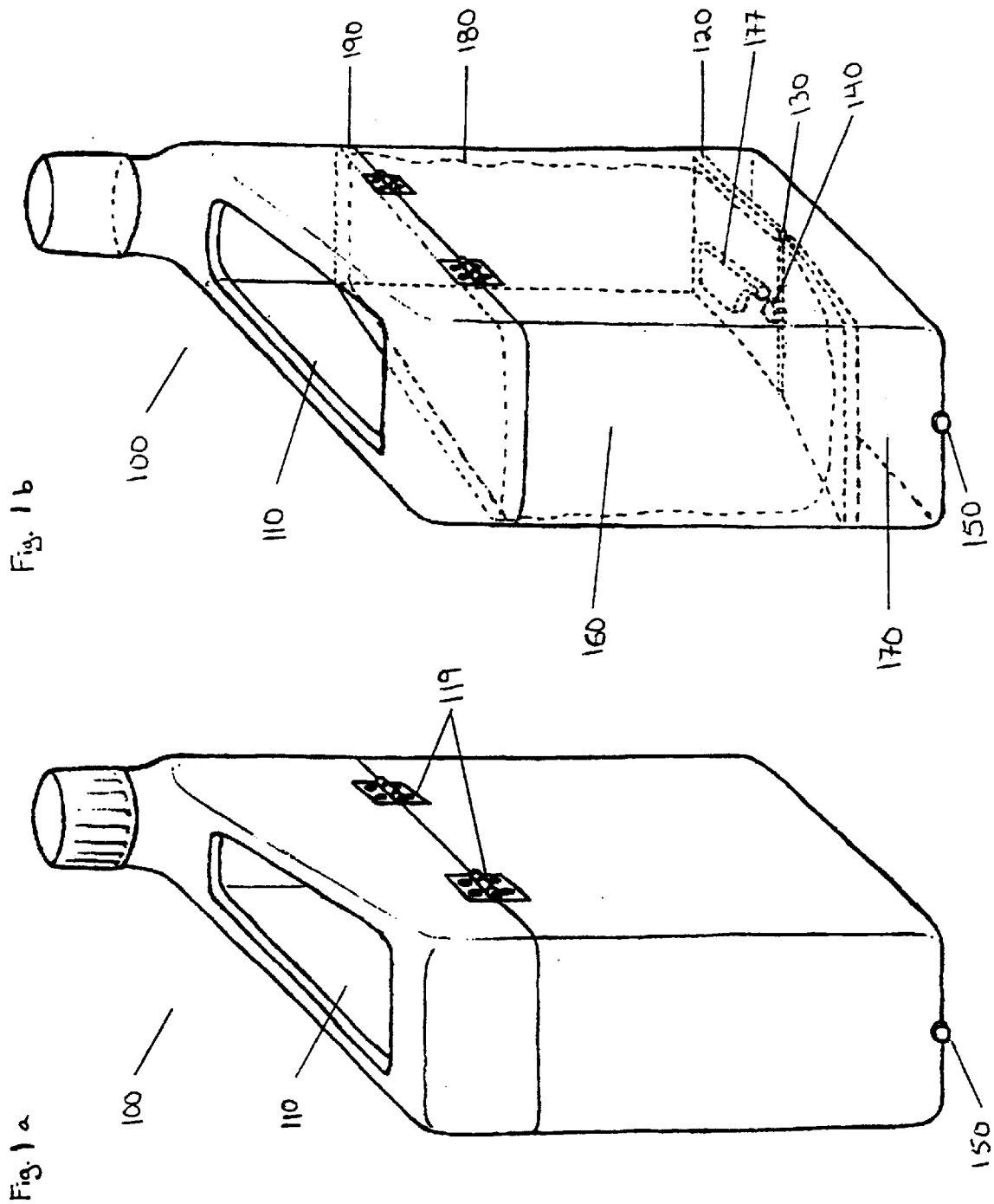

OIL CONTAINER REPOSITORY

BACKGROUND

1. Field of Invention

The present invention is directed to an oil container repository. One of the major characteristics of this repository is that in addition to collecting oil containers, it also collects and separates the left over oil within them.

2. Description of Prior Art

Safe discard and recycling of used motor oil is a preferred practice, also mandated by some public municipalities. Large repositories are generally provided either by public agencies or private vendors for collection and thereafter safe discard of used motor oil. However, no known method or apparatus is available that provides for the collection and recycling of oil containers themselves. Some municipalities provide recycling bins for plastic material such as milk or soft-drink bottles. However, there are strict restrictions in disposing motor oil in the publicly collected trash-cans or recycle bins.

Therefore, there is a need for a repository that collects motor oil containers. Further, there is a need for a repository that can separate the left over motor oil from the container itself for separate recycling. The object of this invention is to accomplish both of said tasks. Another embodiment of the invention can display advertisement items on its outer layer.

For the foregoing reasons, there is a need for an oil container repository for collection and recycling of both the motor oil and the motor oil container.

SUMMARY

The present invention is directed to an oil container repository designed to separately collect used motor oil containers and the residual oil left over within each container so that each can be recycled later. The objective is to facilitate discarding of used motor oil or motor oil container in an environmental conscious and efficient manner.

An embodiment of the invention comprises of (i) a first opening, (ii) a first compartment for collecting discarded oil containers, (iii) a second compartment for collecting said residual oil within said discarded oil containers, (iv) a divider dividing said first and second compartments, having an opening on said divider small enough to prevent discarded oil containers from entering said second compartment, and large enough to allow residual oil within said discarded containers to enter said second compartment, and (v) a third opening to allow for dispensing of residual motor oil collected within said second compartment.

In one embodiment, the divider in between the two compartments is in a "V" shape slope down graded toward the center to allow for the drainage of oil from the discarded containers into the second compartment which may be located directly below the first compartment, through an opening at the bottom of the "V" shaped surface.

In another embodiment, a special bag can be included within the first compartment to allow for collection of the discarded oil containers and for easy collection and recycling of the containers. The bag will preferably have an opening at the bottom center, aligned with the opening in the divider so that the residual motor oil from the discarded containers can flow directly through the opening and into the second compartment located below the divider.

In one embodiment there will be means included to keep the opening of the bag aligned with the opening of the divider, and to keep the both openings unobstructed. The means for accomplishing this task can be made of plastic or any other suitable material and protrude through the opening in the divider into the first compartment and in contact with the opening of the bag. Such means will include grooves to allow the flow of oil from in between said grooves, through the opening in the divider, and toward the second container.

In an example of another embodiment of the invention the shape of the repository is similar to a motor oil container, in a larger scale. Yet in another embodiment, for easy removal of the discarded containers or the bag included within the first compartment, the top portion of the repository may be made to open up on hinges. Other embodiments of the invention can include in addition to the above elements means for affixing advertisement or promotional material on the outer layer of the repository.

BRIEF DESCRIPTION OF THE DRAWINGS

These and other features, aspects, and advantages of the present invention will become better understood with regard to the following description, appended claims, and accompanying drawings where:

FIG. 1.A is a three dimensional illustration of one embodiment of the invention in the shape of an oversized motor oil container with an opening on the top.

FIG. 1.B is a three dimensional illustration of an embodiment of the invention according to FIG. 1.A depicting the inner portions of the current invention as marked by dotted lines.

FIG. 2.B is a three dimensional illustration of an embodiment of the means by which the opening in the divider remains open.

DETAILED DESCRIPTION

Figure 2B:
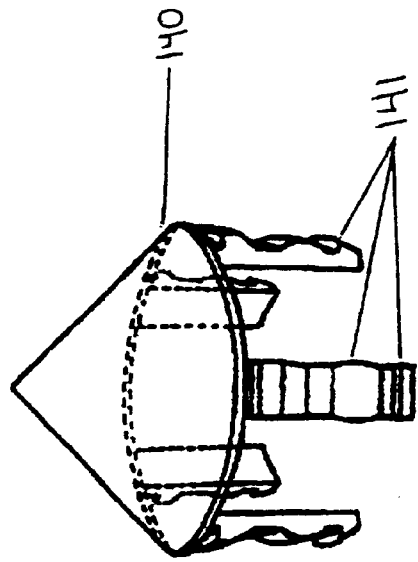
FIG. 2.A is a three dimensional illustration of an embodiment of the invention, where the top portion of the repository is opened on hinges. Dotted lines depict he inner embodiments of the invention.

An oil container repository designed to separately collect used motor oil containers and the residual oil left over within each container so that each item can be recycled later is described herein. The detailed description of this application includes many details to illustrate different possible embodiments of the invention. However, it is not necessary for all or parts of every detail to be included in order to enable a person reasonably skilled in the art to practice the invention. Non-inclusion of minor details will not prevent a person reasonably skilled in the art from successful practice of the invention. Therefore, any inclusion or exclusions of such details should not be construed as to limit the scope of this invention.

With reference to FIGS. 1.A and 1.B an embodiment of the oil repository 100 comprising the features of the present invention includes an opening 110 for receipt of discarded oil containers 177, a first compartment 160 where the discarded containers 177 are collected, a second compartment 170 separated from said first compartment 160 by a divider 120. Divider 120 comprises an opening 130 sufficiently small to prohibit the entry of discarded oil containers 177 into said second compartment 170.

In one embodiment, divider 120 is slanted downward and toward the center creating a sloped surfaces. In an example of the invention 100 the opening 130 is in the middle of the slanted surface of divider 120. Opening 130 is sufficiently large to permit the flow of oil from said first compartment 160, into said second compartment 170. In other embodiments the opening 130 can be through the entire surface of divider 120 as illustrated in FIG. 1.B. In alternative embodiments, opening 130 can be in form of a hole at the center of divider 120, or an opening at one corner of the divider 120 as opposed to the center, or at any other portion of the divider 120.

In an embodiment of the invention, discarded containers 177 are positioned on the oblique surface of divider 120 such that any residue oil remaining within them is released out and into the first compartment 160. Because the opening 130 is not large enough for the discarded containers 177 to pass through, but is large enough for the residue oil to flow through, discarded containers 177 remain within said first compartment 160, while oil residue flows into second compartment 170.

Figure 2A:
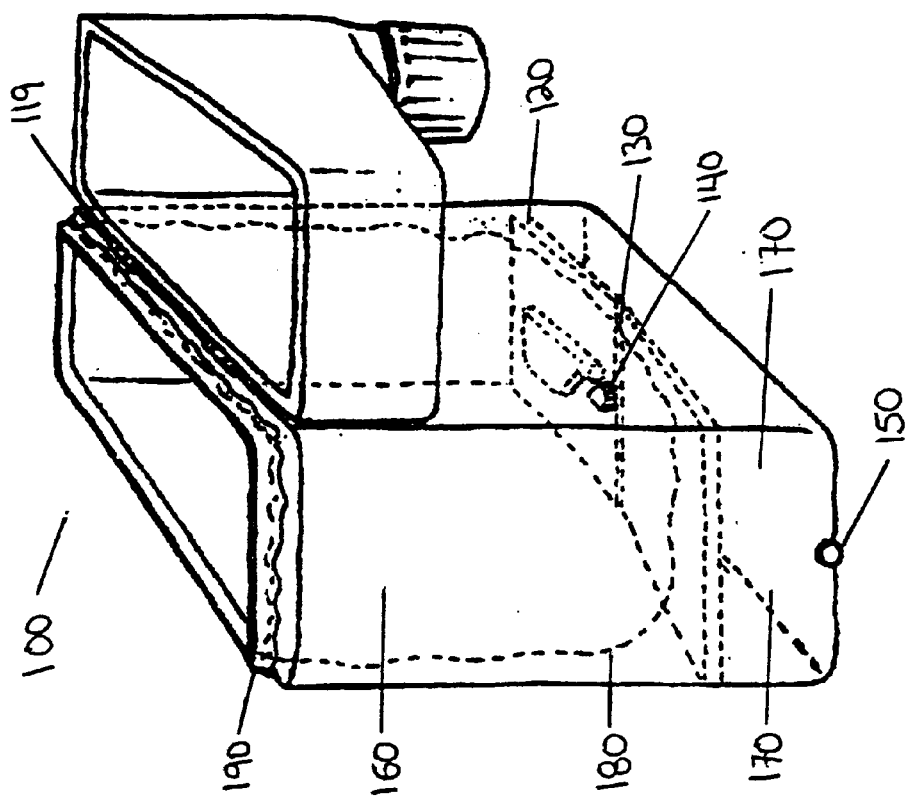

Another embodiment of the invention, includes a bag 180 within said first compartment 160 for collection of discarded oil containers 177. As illustrated in FIG. 2.A. bag 180, in one embodiment is attached to connecting means 190, connecting the opening of bag 180 to the edges of first compartment 160. Connecting means 190 can be in form of any adhesive material, connecting apparatus or can be in form of an embodiment within said fist compartment having edges appropriate for receiving the edges of bag 180. In one embodiment, bag 180 has an opening at its mid bottom to allow for flow of residual oil from the bag 180 in first compartment 160 into second compartment 170.

In one embodiment of the invention, the top portion of repository 100 is attached to one or more hinges 119 allowing the entire top portion to open as illustrated in FIG. 2.A. This permits for easy and speedy removal of bag 180 and all containers 177 collected therein from the first compartment 160. Bag 180 is designed in such manner that it does not obstruct opening 130, thereby allowing free flow of oil from first compartment 160 to second compartment 170.

In an embodiment of the current invention, a separating means 140 is included in relationship with opening 130 such that it prohibits obstruction of opening 130 by any portion of bag 180 or any of the discarded containers 177. As illustrated in FIG. 2.B. separating means 140 can be designed so that it is removable from said opening 130. In other embodiments, it can be permanently installed or be shaped in the form of an elongated separator that runs along the entire length of opening 130. Grooves 141 allow for the flow of oil in between said separating means 140. In another embodiment, separating means 140 may be designed to hold the opening in the mid bottom of bag 180 in alignment with opening 130.

Embodiments of the invention, include an opening 150 for draining of second compartment 170. As first compartment 160 fills with discarded containers 177, second container 170 is filled with residual oil flowing out of discarded containers 177. Opening 150 allows for drainage of second compartment 170. One embodiment of the invention has means for display of commercial material or advertisements on its outer surface.

Current invention can be used in different embodiments. In the embodiment illustrated in FIGS. 1 through 2, discarded motor oil containers 177 are thrown into the repository 100 though opening 110. Containers 177 land on the tilted surface of divider 120 that separates first compartment 160 from second compartment 170. The oblique surface of divider 120 directs out any residual oil inside containers 177. Residual oil flows on the oblique surface of divider 120 toward opening 130. If a bag 180 is included, residual oil flows towards the opening at mid center of said bag 180. Residual oil then flows down through opening 130 into second compartment 170. Separating means 140 prohibits the closure or obstruction of opening 130 by either bag 180 or by discarded containers 177. Grooves within means 140 provides for free flow of residue oil through opening 130.

Discarded containers 177 can be collected by removal of bag 180 if one is included. Residual oil collected within second compartment 170 can be drained through opening 150. In one embodiment of the invention, the entire repository 100 may be recycled with the contents therein.

Although the present invention has been described in considerable detail with reference to certain preferred versions thereof, other versions are possible. For example a version of the invention may not have a top portion that opens with hinges 119 and can be of one piece embodiment. Therefore, the spirit and scope of the appended claims should not be limited to the description of the embodiments described herein.

What is claimed is:

1. An apparatus for collection of discarded containers and residual substance leftover within said containers comprising:

A container having a first opening, a first compartment for collecting discarded containers, and a second compartment for collecting said residual substance within said discarded containers, wherein said first compartment is connected to said second compartment through a second opening and a bag is within said first compartment for collecting discarded containers, said bag having an opening at the bottom center.

2. The apparatus of claim 1 wherein said second opening is small enough to prevent a discarded container from entering said second compartment.

3. The apparatus of claim 2 further comprising a divider separating said first and second compartments from each other, wherein said second opening is located on said divider.

4. The apparatus of claim 3 wherein said divider has a tilted surface towards said second compartment.

5. The apparatus of claim 4 further comprising a third opening at the bottom of said second compartment.

6. The apparatus of claim 5 further comprising means to allow said opening of said bag to remain unobstructed.

7. An apparatus for collection of discarded containers and residual substance leftover within said containers comprising:

a container having
 a first opening,
 a first compartment,
 a second compartment,
 a divider dividing said first and second compartments, having
  a second opening on said divider small enough to prevent
  discarded containers from entering said second compartment,
  and large enough to allow residual substance within said
  discarded containers to enter said second compartment, and
 a third opening to allow for dispensing of residual substance collected within said second compartment,
 a bag for collecting discarded containers, said bag having an opening at the bottom.

8. An apparatus of claim 7 wherein
said divider has a tilted surface toward said second compartment.

9. Apparatus of claim 8 further comprising means to allow said opening of said bag to remain unobstructed.

10. Apparatus of claim 9 wherein the apparatus is in the shape of a motor oil container.

11. Apparatus of claim 10 further comprising a medium on its outer surface suitable for display of advertisement material.

* * * * *